July 27, 1948. H. H. PACKWOOD 2,445,965
POWER LAWN MOWER WITH AIR FILTERING SCREEN
Filed Aug. 7, 1946
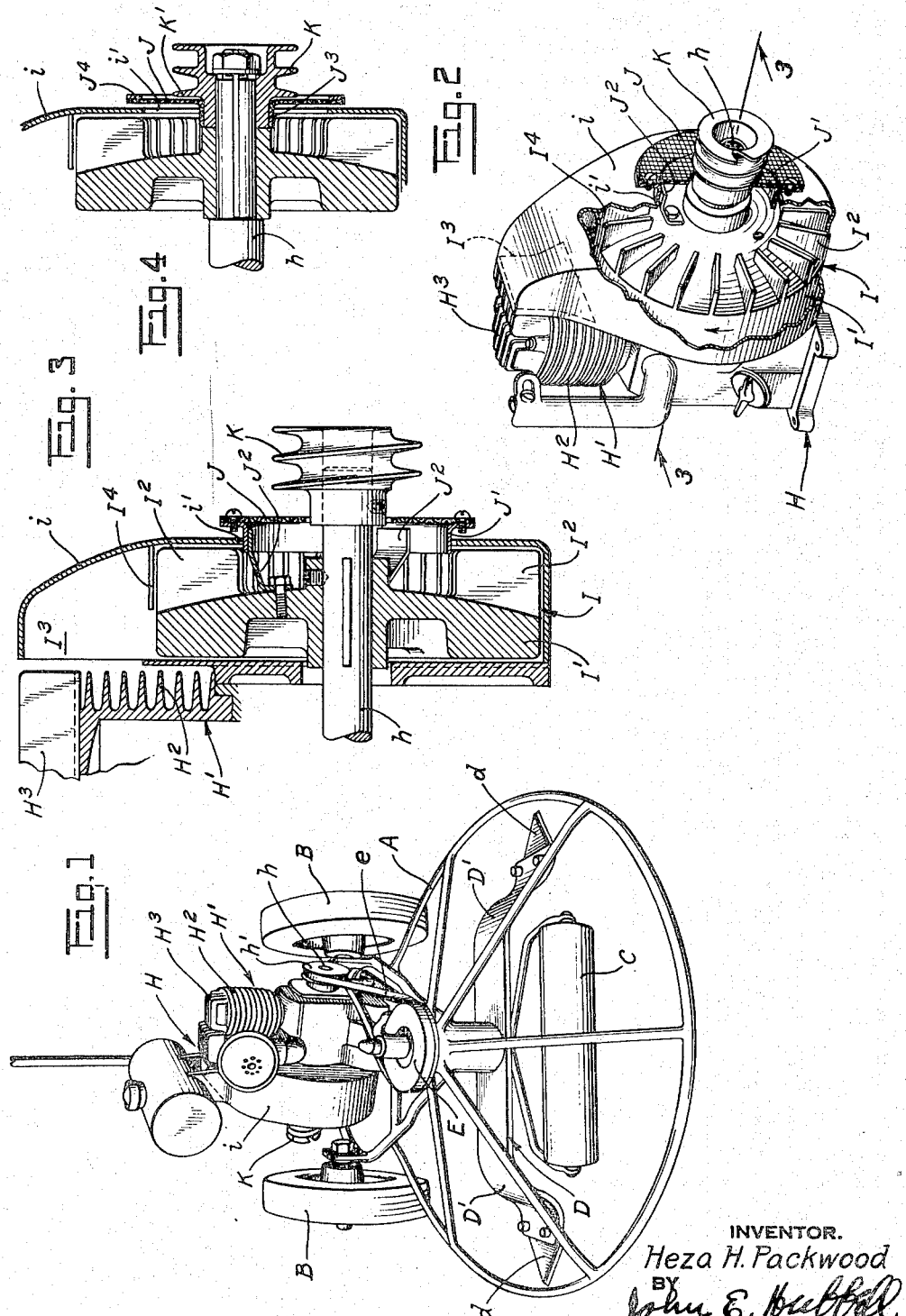
INVENTOR.
Heza H. Packwood
BY
John E. Hubbell
ATTORNEY Patented July 27, 1948

2,445,965

UNITED STATES PATENT OFFICE 2,445,965

REISSUED

POWER LAWN MOWER WITH AIR FILTERING SCREEN

Heza H. Packwood, Baton Rouge, La.

SEP 13 1949

Application August 7, 1946, Serial No. 688,940

2 Claims. (Cl. 56—25.4)

The general object of the present invention is to provide a motor with improved air cooling means. A more specific object of the invention is to provide a motor having a rotary cooling fan with novel means for preventing light weight particles such as leaf and paper fragments from being drawn into the cooling fan housing by the air stream passing through the housing.

A primary object of the invention is to provide a lawn mower motor with improved air cooling means characterized by means provided to prevent light weight particles from being carried into the motor cooling passages. Extensive and increasing use is now being made of small lawn mowers propelled by hand, but in which a small, air cooled motor is mounted on the lawn mower framework and is operatively connected to, and rotates across the cutting element of the lawn mower. In the use of such lawn mowers, trouble is caused by the clogging of the cooling air passages in the motor structure by severed grass blades, lead and paper fragments, and other small bodies drawn into the fan housing through its air inlet by the air moved into the fan housing and thence into the motor cooling passages. The motor usually mounted on a hand-propelled lawn mower is a small internal combustion engine provided with side-by-side external, deep, heat dissipating ribs or fins, separated by relatively deep and narrow grooves which serve as passages for the cooling air. Light bodies swept into said grooves by the cooling air tend to lodge in, and choke the grooves, particularly as freshly severed grass blade tips and other moist bodies lodging in the grooves tend to rapidly dry out and firmly adhere to the walls of the groove.

In accordance with the present invention, I mount a screen on the fan impeller to rotate with the latter and to extend across the path of air flow into the fan housing through its air inlet, and so arrange the impeller and screen that the latter is outside of the fan housing. In consequence, many of the particles arrested by the rotating screen are dislodged by the action of forces created by the operation of the lawn mower, and those not so dislodged, may be readily scraped or knocked off the rotating screen, and remain outside of the fan housing. I thus avoid objections to the use of screen arrangements for fans previously proposed. In most arrangements previously proposed, a screen has been attached to the outer side of the fan housing at the margin of the air inlet. Such a stationary screen is open to the practical objection that light particles which are arrested by the screen adhere thereto and tend to accumulate on the screen and impair the movement of air into the fan. In another old proposed arrangement, a screen is mounted on an air impeller within a fan housing, at the inlet side of the air inlet. Particles arrested by such a screen and not dislodged by the operation of the mower, are not readily removed from the screen, and, when dislodged, remain in the fan housing.

The various features of novelty which characterize my invention are pointed out with particularity in the claims annexed to, and forming a part of this specification. For a better understanding of the invention, however, its advantages and specific objects attained by its use, reference should be had to the accompanying drawings and descriptive matter in which I have illustrated and described preferred embodiments of the invention.

Of the drawings:

Fig. 1 is a perspective view of a lawn mower;

Fig. 2 is a perspective view of the motor and cooling fan of the lawn mower shown in Fig. 1;

Fig. 3 is an elevation partly in section on the line 3—3 of Fig. 2; and

Fig. 4 is a sectional elevation illustrating a modified construction.

In the drawings I have illustrated the use of the present invention by way of example, in a lawn mower of the general type and form disclosed in my prior Patent No. 2,287,126 of June 23, 1942. As shown in Fig. 1, the lawn mower comprises a framework A supported by rear ground engaging wheels B and by a front roller C. The rotating cutter element D of the lawn mower is supported for rotation about a vertical axis so located that the horizontal cutting blades $d$ at the opposite ends of the element D move along an annular path which surrounds the roller C. The body portion of the element D comprises inclined or arc shaped portions D', connected at their lower ends to the cutting blade wheel $d$ and a central horizontal portion to which a driving pulley E is attached. The cutter element is rotated by a belt $e$ looped about the pulley E and about a driving pulley $h'$ carried by the horizontal shaft $h$ of an internal combustion engine H mounted on the lawn mower framework with the shaft $h$ extending transversely to the plane including the axis of the pulley E and intersecting the pulley $h'$.

As shown, the motor H comprises a single, vertically disposed, combustion chamber or cylinder H'. The latter is provided with a series of external heat dissipating ribs or fins $H^2$ in the form of rings coaxial with the chamber H', and of a radial extent substantially greater than the distance between the adjacent fins. Usually and as shown, the width of the space between adjacent ribs H' increases from the inner edge to the outer edge of the space, at which the width is of the order of three-eighths of an inch or less. As shown, the upper end of the chamber or cylinder H' is provided with uprising ribs or fins H³ arranged side-by-side and substantially parallel with the shaft h, and separated by narrow spaces or grooves.

When the lawn mower is in operation, cooling air is moved along the surface of the fins or ribs H² and H³ by fan means shown as of conventional type comprising a rotary impeller I, and a fan casing or housing i having a lateral air inlet i' substantially coaxial with the engine shaft h. As shown, the impeller I comprises a heavy disk-like body portion I' mounted on the engine shaft h and serving as the engine flywheel. The side of the body I' adjacent the lateral inlet i' is convex, and integral fan blades or vanes I² project from the peripheral portion of the convex side of the body I'. The vanes I² extend away from the impeller body in the axial direction of the fan, and, as shown, they surround and extend radially away from an air space between the body I' and inlet i'. The fan housing is formed with an upper outlet portion having a side opening I³ alongside the engine so as to discharge air into the grooves between the ribs or fins H² and H³. The fan housing is also formed with a baffle I⁴ extending over the impeller vanes at one side of the vertical plane through the impeller axis so as to prevent downward air slip movement at the side of the fan housing in which the vanes move downward.

In accordance with the present invention, means are provided for the attachment to the impeller I of a screen J external to the fan housing and extending across the path of air flow into the fan chamber through its inlet i'. As shown in Figs. 2 and 3, the screen is of flat annular form and surrounds the hub or body portion of the engine starting pulley K carried by the engine shaft h and around which a rope or cord may be wound for use in spinning the shaft h to start the engine in a manner in which small internal combustion engines are customarily started. The central opening in the screen is shown as receiving the starting pulley K and is not needed when the invention is used with an engine in which the starting pulley is omitted. In such case, the central portion of the screen may be made of the same pervious material as the rest of the fan or it may be made of impervious material, such for example as a disk of sheet metal.

In the arrangement shown in Figs. 2 and 3, the screen J is attached at its periphery to an annular member J' having a cylindrical portion extending through the air inlet i'. The member J' is connected to and supported by the outer ends of spider arms J² which have their inner ends attached to the impeller body I'. Other arrangements for attaching the screen to the impeller may be employed, and in a preferred arrangement shown in Fig. 4, the screen is attached to the starting pulley member K. In the particular construction shown in Fig. 4, the screen is formed with a cylindrical flange portion J³ which surrounds, and fits snugly on and is spot welded to the hub portion of the starting pulley K. Alternatively, the body portion of the screen may be welded or otherwise secured to the adjacent pulley groove wall K'. The screen J shown in Fig. 4 is a woven wire one-quarter inch mesh screen made of relatively heavy wire and reinforced at its periphery by a metal ring J⁴ welded to the side of the screen. The screen diameter is a half inch or more greater than the diameter of the inlet opening i' and a clearance space, which may be about one-sixteenth of an inch thick, is provided between the peripheral portion of the screen and the portion of the fan casing which it overlaps.

Ordinarily, the screen J may be flat as shown, though the screen may also be convex or cylindrical in form. The screen may be formed of perforated sheet metal or other usual screen forming material, but I have found it advantageous to employ a screen of woven wire of relatively large diameter, as the surface roughness of such a screen seems to facilitate the dislodgment of grass blades, pieces of paper, etc., arrested by the screen.

With the screen outside of the fan casing as shown, particles arrested by the screen and dislodged are free to move laterally away from the screen and out of the path of air flow into the fan housing. The dislodgment of the particles may be effected in various ways, but ordinarily is effected by one at least, and usually by more than one of the following forces of actions, namely, the force of gravity, centrifugal force, vibrations due to the operation of the mower, the out flow, adjacent the periphery of the inlet opening i', of some of the air drawn into the central portion of the space surrounded by the fan blades, and manual scraping and jarring actions. The clogging of the engine cooling air channels is not the only disadvantage avoided by the use of the present invention. In some cases grass blades or other solid particles if allowed to enter the fan structure create trouble therein. Thus, for example, some internal combustion engines are provided with an engine governor comprising a vane adjacent the path of the tips of the fan vanes and arranged to move in response to variations in the force of the impact of the air passing away from the vanes. Grass blades and the like drawn into the fan housing of such an engine may seriously interfere with the operation of its governor.

While the invention is of especial utility for lawn mower use it is adapted for other uses. In accordance with the provisions of the statutes, I have illustrated and described the best forms of embodiment of my invention now known to me, but it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. In a lawn mower, the combination with the lawn mower framework, of a rotary grass cutter and a motor having a rotating driving shaft mounted in said framework, a motor cooling fan comprising a rotating air impeller carried by said shaft at one side of said motor and a fan casing enclosing said impeller and having an air inlet at the opposite side of the impeller from said motor and having an outlet for the discharge of cooling air against the motor, and an inlet screen carried by said shaft at the outer side of said inlet opening and extending across the path of air flow through said opening, whereby bodies which the air drawn into the casing through said inlet tends to carry into the fan casing, are arrested by the screen and when dislodged, pass into the space external to said casing.

2. In a lawn mower, the combination with the lawn mower framework, of a rotary grass cutter and an internal combustion motor having a rotating driving shaft mounted in said framework, a motor cooling fan comprising a rotating air impeller carried by said shaft at one side of the motor and a fan casing enclosing said impeller and having an air inlet at the opposite side of the impeller from said motor and having an outlet for the discharge of cooling air against the motor, a starting pulley mounted on said shaft and having a portion at the outer side of said inlet opening, and an inlet screen at the outer side of said inlet opening and extending across the path of air flow through said opening and connected to and supported and rotated by said pulley, whereby bodies which the air drawn into the casing through said inlet tends to carry into the fan casing, are arrested by the screen and when dislodged, pass into the space external to said casing.

HEZA H. PACKWOOD.

REFERENCES CITED

The following references are of record in the file of this patent:

UNITED STATES PATENTS

| Number | Name | Date |
|---|---|---|
| 2,121,749 | Urschel | June 21, 1938 |
| 2,390,321 | Packwood | Dec. 4, 1945 |
| 2,438,669 | Krenzke | Mar. 30, 1948 |